(12) United States Patent
Caron et al.

(10) Patent No.: US 12,379,938 B2
(45) Date of Patent: Aug. 5, 2025

(54) NANOSERVICE COMPUTING AND ARCHITECTURE

(71) Applicant: Dell Products L.P., Round Rock, TX (US)

(72) Inventors: Eric L. Caron, Ottawa (CA); Eric Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 17/822,294

(22) Filed: Aug. 25, 2022

(65) Prior Publication Data

US 2024/0069927 A1    Feb. 29, 2024

(51) Int. Cl.
*G06F 9/44* (2018.01)
*G06F 9/445* (2018.01)

(52) U.S. Cl.
CPC ...... *G06F 9/44505* (2013.01); *G06F 9/44521* (2013.01)

(58) Field of Classification Search
CPC .......................... G06F 9/44505; G06F 9/44521
See application file for complete search history.

(56) References Cited

U.S. PATENT DOCUMENTS

| | | | |
|---|---|---|---|
| 2012/0050780 A1* | 3/2012 | Osawa | G06F 9/4881 718/100 |
| 2021/0081252 A1* | 3/2021 | Bhargava | G06F 9/5072 |
| 2021/0124577 A1* | 4/2021 | Gupta | G06F 9/45533 |
| 2021/0234930 A1* | 7/2021 | Dinh | G06F 8/425 |
| 2021/0311632 A1* | 10/2021 | Watson | G06F 3/0644 |
| 2021/0409917 A1* | 12/2021 | Wang | G08G 1/09675 |
| 2022/0129284 A1* | 4/2022 | Zhou | G06F 8/71 |

OTHER PUBLICATIONS

Richardson, Chris: What are microservices? https://microservices.io/ accessed as early as Mar. 25, 2022; Copyright © 2021.

* cited by examiner

*Primary Examiner* — Hang Pan
(74) *Attorney, Agent, or Firm* — Workman Nydegger

(57) ABSTRACT

A nanoservice architecture allows a service to include multiple functions or features along with a common skeleton code. Each of the nanoservices in a service may be configured using a common configuration file. The configuration file may include a portion that configures requirements or resources common to all nanoservices and other portions that are specific to associated nanoservices.

19 Claims, 9 Drawing Sheets

```
Nanoservice Factory.Run(
    ctx,
    cancel,
    cfg,
    []interfaces.Nanoservice FactoryHandler{
       nanoservice_A.Listener(data_processor.DataInfo, ctx, cfg, logger).Nanoservice
FactoryHandler,
       nanoservice_B.Listener(ctx, cfg, logger).Nanoservice FactoryHandler,
    })
```

Figure 4A

```
{
    "metrics": {
      "retries": 10,
      "timeout": 10,
      "host": "localhost",
      "port": 8529,
      "protocol": "http"
    },
    "serviceA-processing": {
      "serviceAInfo": {
        "sourceDatabase": "MyDB",
        "sourceCollection": "MyData",
        "targetDatabase": "experiment_1",
        "targetCollection": "serviceAData"
      },
      "serviceAStatus": {
        "sourceDatabase": "MyDB",
        "sourceCollection": "MyData",
        "targetDatabase": "experiment_1",
        "targetCollection": "serviceAStatus"
      }
    },
    "serviceB-Config": {
      "sourceDatabase": "MyDB",
      "sourceCollection": "MyData",
      "targetDatabase": "experiment_1",
      "targetCollection": "serviceBData",
      "dataAThreshold": 1.5,
      "geo-zones-A": [ ],
      "dataBThreshold": 1.5,
      "geo-zones-B": [ ]
    },
    "logging": {
      "minLogLevel": "info"
    }
}
```

Figure 4B

```
package data_abstraction import (
    "encoding/json"
)

type ApplicationConfig struct {
    DBConfig     ConnectionConfig      `json:"metrics,omitempty"`
    ServiceAConf ServiceAConfig        `json:"serviceA-processing,omitempty"`
    ServiceBConf ServiceBConfig        `json:"serviceB-Config,omitempty"`
    Logging      logging.LoggingInfo   `json:"logging,omitempty"`
    Zones        []Zone                `json:"geo-fences,omitempty"`
}
```

```
type RouteCollectionInfo struct {
    SourceDatabase   string `json:"sourceDatabase,omitempty"`
    TargetDatabase   string `json:"targetDatabase,omitempty"`
    SourceCollection string `json:"sourceCollection,omitempty"`
    TargetCollection string `json:"targetCollection,omitempty"`
}

// Configuration for service-B-processing
type ServiceBConfig struct {
    // Where to find raw data
    SourceDatabase   string `json:"sourceDatabase,omitempty"`
    SourceCollection string `json:"sourceCollection,omitempty"`

// Where to write ServiceB data that exceeds thresholds
    TargetDatabase   string `json:"targetDatabase,omitempty"`
    TargetCollection string `json:"targetCollection,omitempty"`

// Threshold event values
    Example1Threshold float64  `json:"dataAThreshold,omitempty"`
    Example1Zones     []string `json:"geo-zones-A,omitempty"`
    Example2Threshold float64  `json:"dataBThreshold,omitempty"`
    Example2Zones     []string `json:"geo-zones-B,omitempty"`
}
```

```
fileFormat := config.GetFileExtension(configPath)
        reader, err := config.NewReader(fileFormat)                                    410
if err != nil {
    tmpLog := logFactory.NewLogger(logConfig.LoggingInfo{MinLogLevel: logging.ErrorLevel})
    tmpLog.Error(err.Error())
    os.Exit(1)
} cfg := data_abstraction.ApplicationConfig{}
err = reader.Read(configPath, &cfg)
if err != nil {
    tmpLog := logFactory.NewLogger(logConfig.LoggingInfo{MinLogLevel: logging.ErrorLevel})
    tmpLog.Error(err.Error())
    os.Exit(1)
} logger := logFactory.NewLogger(cfg.Logging)
```

Figure 4E

```
ctx, cancel := context.WithCancel(context.Background())
_, err = data_abstraction.NewArangoCheckUp(ctx, cfg, logger).Setup()           412
if err != nil {
    tmpLog := logFactory.NewLogger(logConfig.LoggingInfo{MinLogLevel: logging.ErrorLevel})
    tmpLog.Error(err.Error())
    os.Exit(1)
}
```

Figure 4F

NANOSERVICE COMPUTING AND ARCHITECTURE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention generally relate to services, computing systems, and computing architectures. More particularly, at least some embodiments of the invention relate to systems, hardware, software, computer-readable media, and methods for a computing architecture to improve at least footprint, deployment, and/or management overhead.

BACKGROUND

A microservice architecture allows an application to be structured as a collection of microservices. This type of architecture has several advantages. The architecture is more easily maintained because each microservice of the application is separate from the other microservices. The microservices may be coupled from the context of the overall application but are often deployed independently. The microservice architecture allows larger monolithic applications to be implemented as smaller components that can be managed separately and independently.

The microservice architecture also has some disadvantages. Because each microservice is typically focused on a specific function or feature, the number of microservices that are deployed may become large. In other words, the number of microservices in an application that need to be separately designed, tracked, debugged, developed, and deployed can increase for various reasons and become burdensome.

In addition, microservice frameworks and management platforms require each microservice to include skeleton code. Each microservice, in face, includes the same skeleton code. This increases the disk and memory footprints of the microservices and can consumes resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4A discloses aspects of a nanoservice factory pattern for instantiating a nanoservice;

FIG. 4B discloses aspects of configuring nanoservices;

FIG. 4C discloses aspects of the configuration file;

FIG. 4D discloses aspects of nanoservice configurations;

FIGS. 4E and 4F disclose aspects of configuring nanoservices;

DETAILED DESCRIPTION OF SOME EXAMPLE EMBODIMENTS

Embodiments of the present invention generally relate to a computing or software architecture. More particularly, at least some embodiments of the invention relate to systems, hardware, software, computer-readable media, and methods for a nanoservice architecture.

Embodiments of the invention relate to a nanoservice architecture that overcomes or improves on aspects of other architectures such as a microservice architecture. Compared to a microservice architecture, embodiments of the nanoservice architecture provide improved granularity without the overhead associated with microservices. The nanoservice architecture allows components to be built that, compared to microservice instances, have a smaller deployment with lower footprint, deployment and management overhead. In one example embodiment, this is achieved by allowing nanoservices to be coupled or more strongly related to each other.

A nanoservice architecture allows granular components, which may each implement a specific requirement, to be grouped together around a common feature or quality. Even if the nanoservice architecture includes some overhead, the overhead is reduced compared to a scenario where these components are launched as individual microservices.

Figure 1:
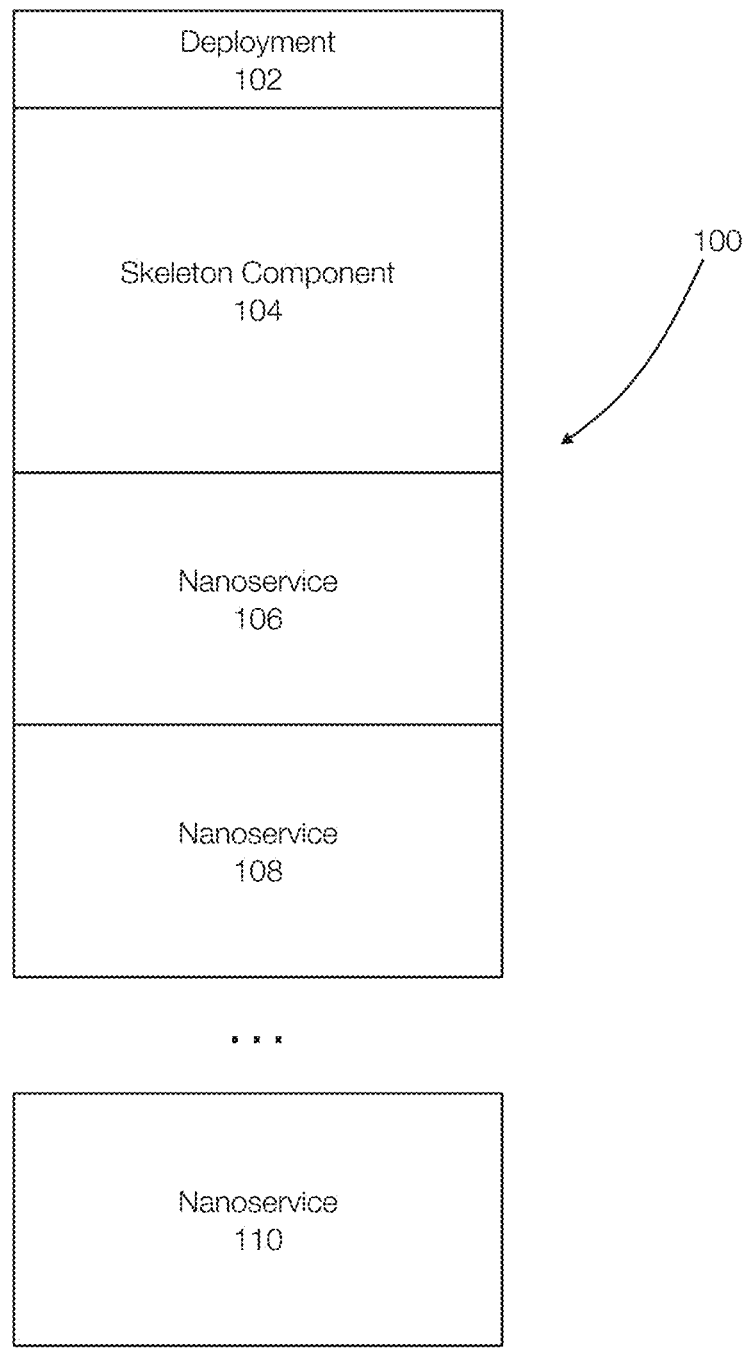
FIG. 1 discloses aspects of a nanoservice architecture.

FIG. 1 discloses aspects of a service architecture or, more specifically, a nanoservice architecture. The architecture 100 may be configured to instantiate a deployment 102. The deployment 102 may refer to a collection of nanoservices, which may be related functionally, by purpose, or in another manner. Thus, the deployment 102 can execute or include multiple nanoservices, represented by nanoservices 106, 108, and 110.

The deployment 102 may include a skeleton component 104. The skeleton component 104 is common to all of the nanoservices 106, 108, and 110 and generally includes code to start the nanoservices, handle configurations and modifications related to the nanoservices, and shut down the nanoservices. For example, the skeleton component 104 may include or provide an instantiation framework, process termination signals, common logging handling, common configuration file loading and handling, common resource handling such as datasets, database connections, and the like.

In an example embodiment, each of the nanoservices 106, 108, and 110 may be configured to perform a specific function. However, nanoservices can be added to or removed from the deployment 102 as necessary without starting another instance of the deployment 102. However, multiple instances of the deployment 102, each capable of handling multiple nanoservices, may be used in embodiments of the invention. Stated differently, once a nanoservice is deployed to a node or other location, other nanoservices can be deployed to the same node or location. The additional nanoservices benefit from the skeleton code that is already present on the node. This improves the architecture's granularity while managing footprint and other overhead.

Figure 2:
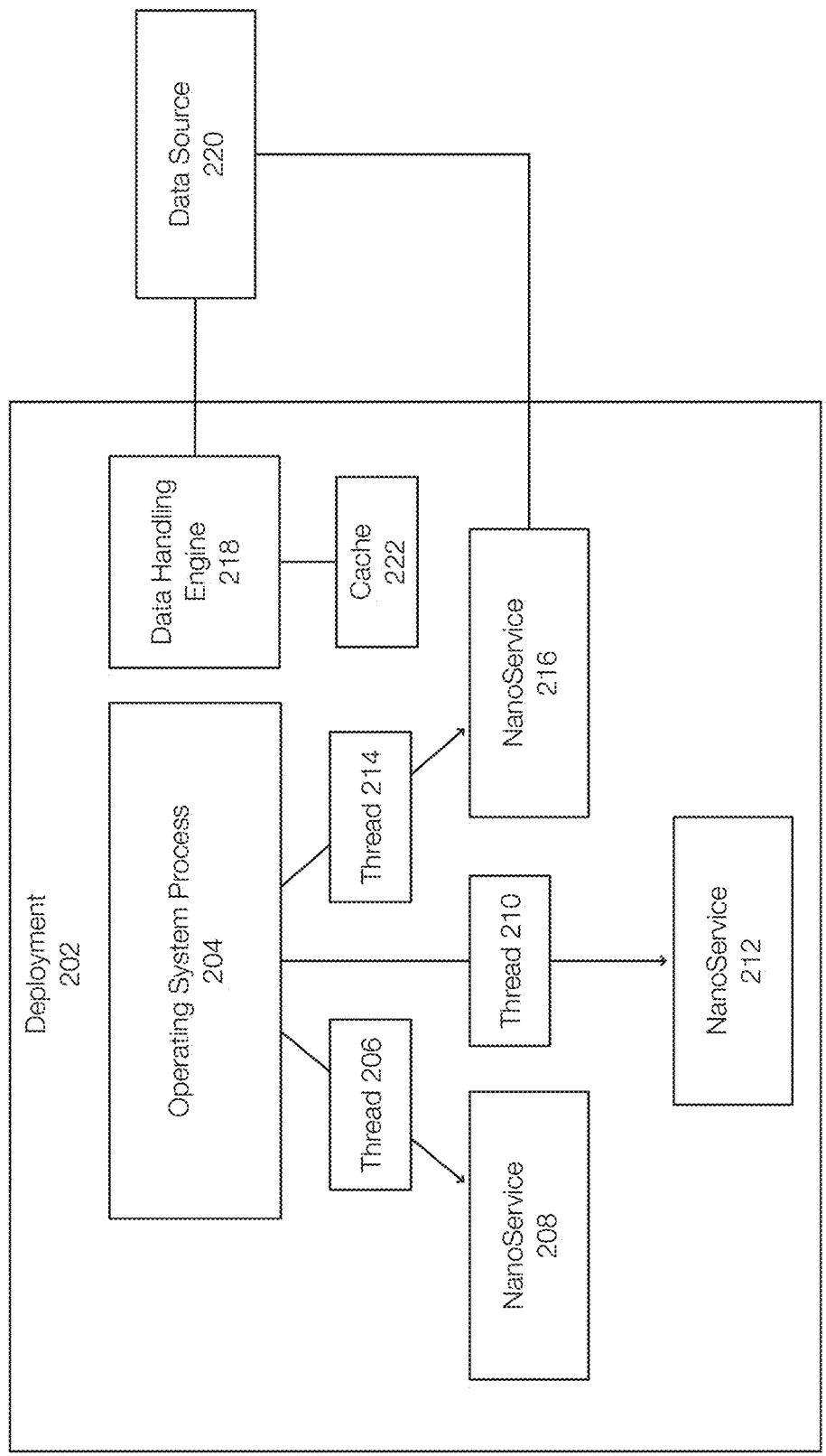
FIG. 2 discloses additional aspects of a nanoservice architecture.

FIG. 2 discloses additional aspects of a nanoservice architecture. FIG. 2 illustrates a deployment 202 that is running nanoservices 208, 212, and 216. In one embodiment, the deployment 202 supports multiple threads. In the deployment 202, the operating system process 204 instantiated the threads 206, 210, and 214. The thread 206 is associated with the nanoservice 208, the thread 210 is associated with the nanoservice 212, and the thread 214 is associated with the nanoservice 216.

In one example, a data handling engine 218, which may be part of the skeleton component, may handle interactions between all nanoservices 208, 212, and 216 in the deployment 202 and a data source 220 (e.g., a database or other data storage). The data handling engine 218 may also support caching in a cache 222 such that incoming data from the data source 220 can be cached and consumed by one or more the nanoservices 208, 212, and 216. The cache mechanism of the data handling engine 218 may use multi-threaded cache techniques to the data from the data source 220 can be consumed by the nanoservices 208, 212, and 216.

If the data in the cache 222 cannot achieve or fulfill the requirements of, for example, the nanoservice 216, the nanoservice 216 may access the data source 220 directly or independently of other nanoservices 208 and 212. Data may also be cached from a streaming data source.

Figure 3:
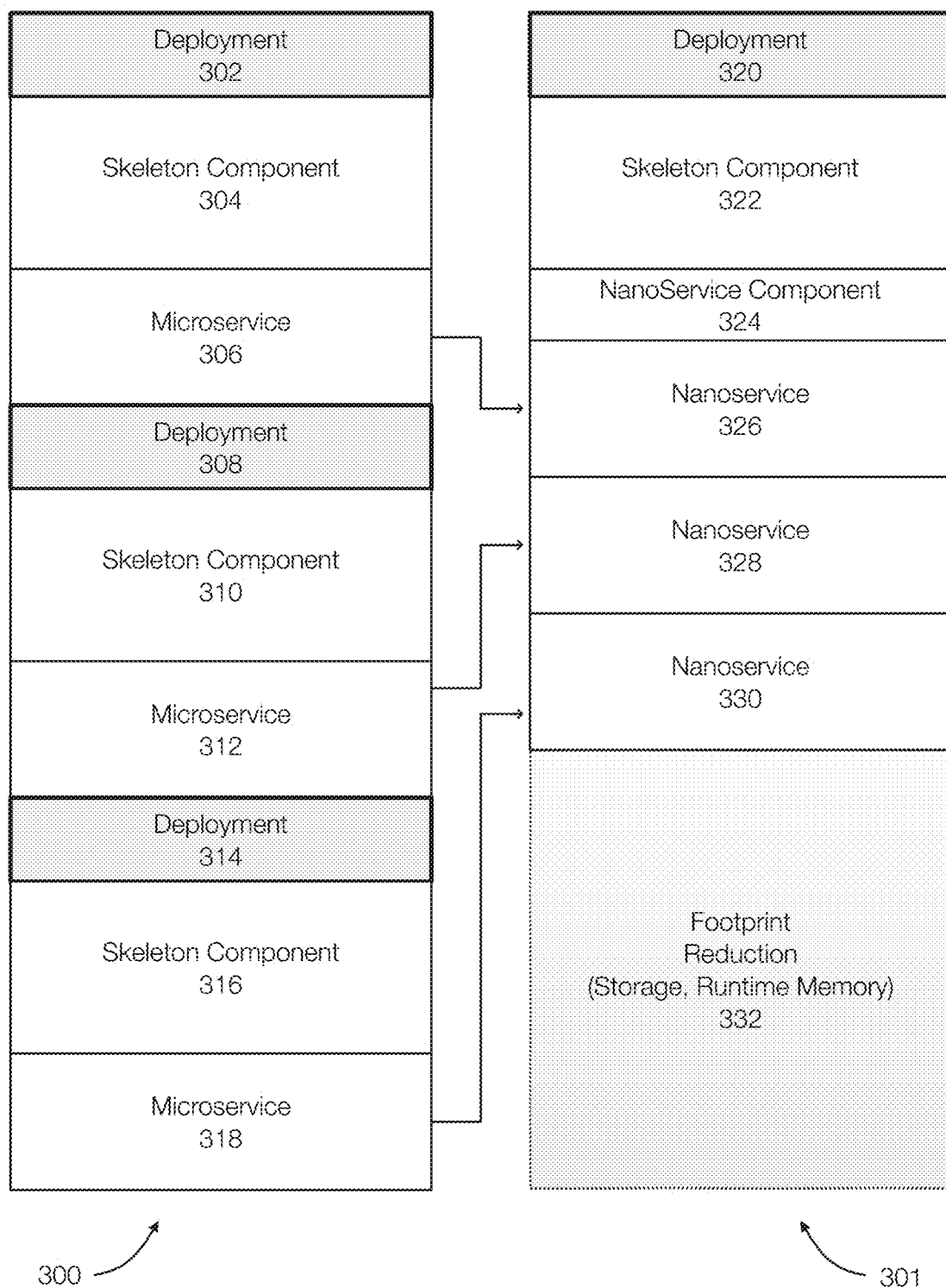
FIG. 3 discloses aspects of a nanoservice architecture including, by comparison, footprint reduction.

FIG. 3 discloses compares aspects of different architectures. FIG. 3 illustrates an example of a microservice architecture 300 and a nanoservice architecture 301. In this example, the microservice architecture 300 and the nanoservice architecture 301 are configured to implement the same functions or features. The microservice architecture 300 requires a separate deployment for each microservice. This results in the deployments 302, 308, and 314. The deployment 302 runs the microservice 306, the deployment 308 runs the microservice 312, and the deployment 314 runs the microservice 318. As illustrated, each of the microservices 306, 312, and 318 of the deployments 302, 308, and 314 require their own corresponding skeleton components 304, 310, and 316.

In contrast, the nanoservice architecture 301 can implement the nanoservices 326, 328, and 330 in the same deployment 320. A single skeleton component 322 is provided for the deployment 320. A nanoservice component 324 may also be provided in the deployment 302. Running multiple nanoservices 326, 328, and 330 in the deployment 320 may require additional overhead, which is represented as the component 324. However, the nanoservice component 324 is small compared to the skeleton components that would be required if implemented individually.

As illustrated, the nanoservice architecture 301 provides a footprint reduction 332 in terms of storage space, runtime memory, and the like. Further maintenance and management issues related to microservice proliferation, as illustrated in the architecture 300 (multiple deployments 302, 308, and 314) is reduced in the architecture 301.

FIG. 4A illustrates aspects of a nanoservice factory pattern for deploying or instantiating a deployment, also referred to as a service. More specifically FIG. 4A discloses aspects of instantiating one or more nanoservices in the same deployment or service. By way of example, the code 402 instantiates two nanoservices, named nanoservice A and nanoservice B. The factory pattern allows nanoservices to be created or instantiated in the same deployment (e.g., the deployment 320).

FIG. 4B discloses aspects of configuring nanoservices in a service. The configuration file 404 (or code) allows multiple nanoservices to be configured, for example by delimiting sections therein. Thus, a single file 404 includes multiple nanoservice configuration sections by way of example only.

During execution, each of the nanoservices executing on a service may access and process its corresponding section. The service may process sections relevant to all of the nanoservices in the service. The configuration file 404 allows aspects of specific nanoservices to be separated from aspects of other nanoservices within the same deployment. More specifically, each of the nanoservices in a deployed service references and processes only its corresponding section of the configuration file.

FIG. 4C illustrates aspects of the configuration file. Assuming that the nanoservices in a service are part of the same overall application, the code 406, which may be included in the configuration file 404, may be relevant to all of the nanoservices. In the code 406, for example, logging and database configuration are common to all of the nanoservices in the same deployment or service.

FIG. 4D discloses aspects of nanoservice configurations. The code 408 illustrates code 408 defining nanoservice configurations inside a common nanoservice factory configuration. The code 408 illustrates two example nanoservices.

FIG. 4E discloses sample code to load an entire configuration file into memory. Once the code 410 is loaded in memory, the service level code may use the database connection and logging details. Other portions are handled by the specific nanoservices.

FIG. 4F illustrates that a database connections object can be shared by all nanoservices within that same service or deployment. Thus, the code 412 illustrates that nanoservices can share resources such as database connections, logging, or the like.

During the development or execution of an application, there may be a need or desire to introduce a new feature or function. The new feature or function may have small differences or subtle differences to existing features or functions. As described, this would conventionally require the creation of a new microservice in its entirety. This may be wasteful when considering the value of the new feature compared to the overhead associated with the new microservice. Embodiments of a nanoservice architecture provide the ability to deploy new features or functions at a lower overhead.

Figure 5:
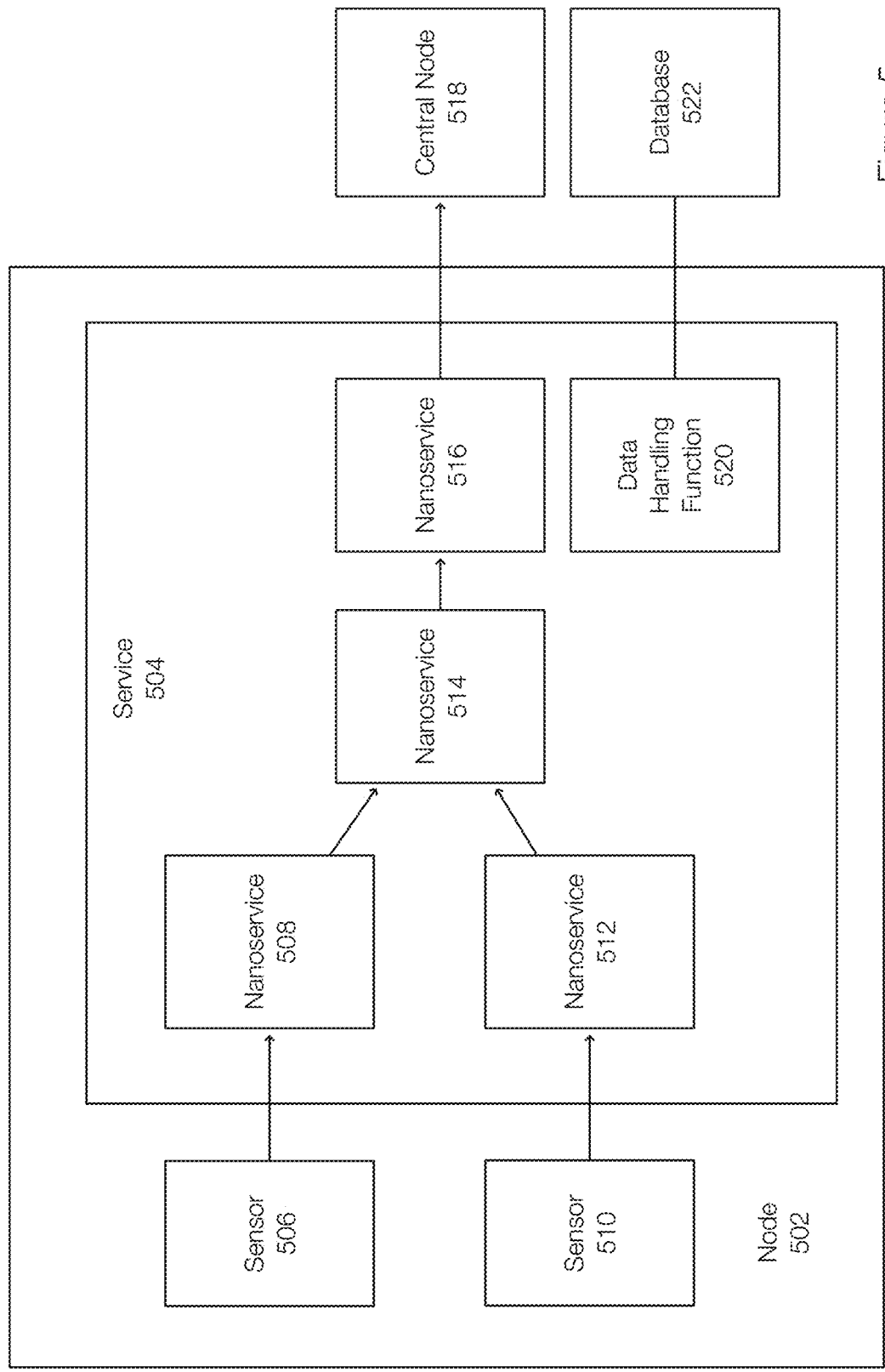
FIG. 5 discloses aspects of nanoservices deployed to one or more nodes operating in an environment.

FIG. 5 discloses aspects of a nanoservice deployment in an environment. More specifically, FIG. 5 illustrates a node 502. The node 502 may represent a device operating in an environment, such as a warehouse. More specifically, the node 502 may represent a forklift, an automated robot, or other device. The node 502 may more specifically refer to computing hardware/software on a device.

The node 502 may be associated with sensors, represented by the sensors 506 and 510. For a forklift, example sensors may include acceleration/deceleration sensors, proximity sensors, mast height sensors, position sensors or the like or combination thereof. Other devices may have different sensor configurations and/or sensor types.

In this example, a service 504 is deployed to the node 502. Thus, the service 504 operates and is instantiated in the computing hardware (e.g., memory, processors, network hardware) of the node 502. The service 504 may include nanoservices 508, 512, 514, and 516. The nanoservice 508 may be configured as a device driver and handler for the sensor 506. The nanoservice 512 may be configured as a device driver and handler for the sensor 510.

This illustrates that the nanoservices 508, 412, 514, and 516 of the service 504 have a common purpose and are part of the same application but are implemented as described herein. During operations, the operation of the service 504 is achieved by the individual operation of the nanoservices.

For example, the nanoservices 508 and 512 may collect sensor readings or sensor data. The nanoservice 514 may collect the sensor data collected by the nanoservices 508 and 512. The nanoservice 514 may batch and timestamp the sensor data. The nanoservice 516 may publish the batches to a central node 518.

The central node 518 may include superior processing or computing resources compared to the node 502 and is configured to process the sensor data, communicate with the node 502, or the like. For example, the central node 518 may receive sensor data from multiple nodes and process the data as needed.

The nanoservices 508, 512, 514, and 516 each interact with sensor data, but in different ways. Each of the nanoservices 508, 512, 514, and 516 may perform different functions or features of the same application.

In contrast to a microservice deployment where each microservice maintains their own active database connections, the nanoservices 508, 512, 514, and 516 can share a single database connection. Advantageously, a data handling function 520 may further minimize or reduce resource consumption. The data handling function 520 of the service 504 may handle interactions with the database 522 on behalf of the nanoservices 508, 514, and 520. The data handling function 520 may be a nanoservice itself or may be part of the skeleton code or part of the nanoservice overhead.

The data handling function 520 may handle in-memory caching and may use multi-threaded data sharing techniques. However, each of the nanoservices 508, 512, 514, and 516 may retrieve data directly from the database 522.

Figure 6:
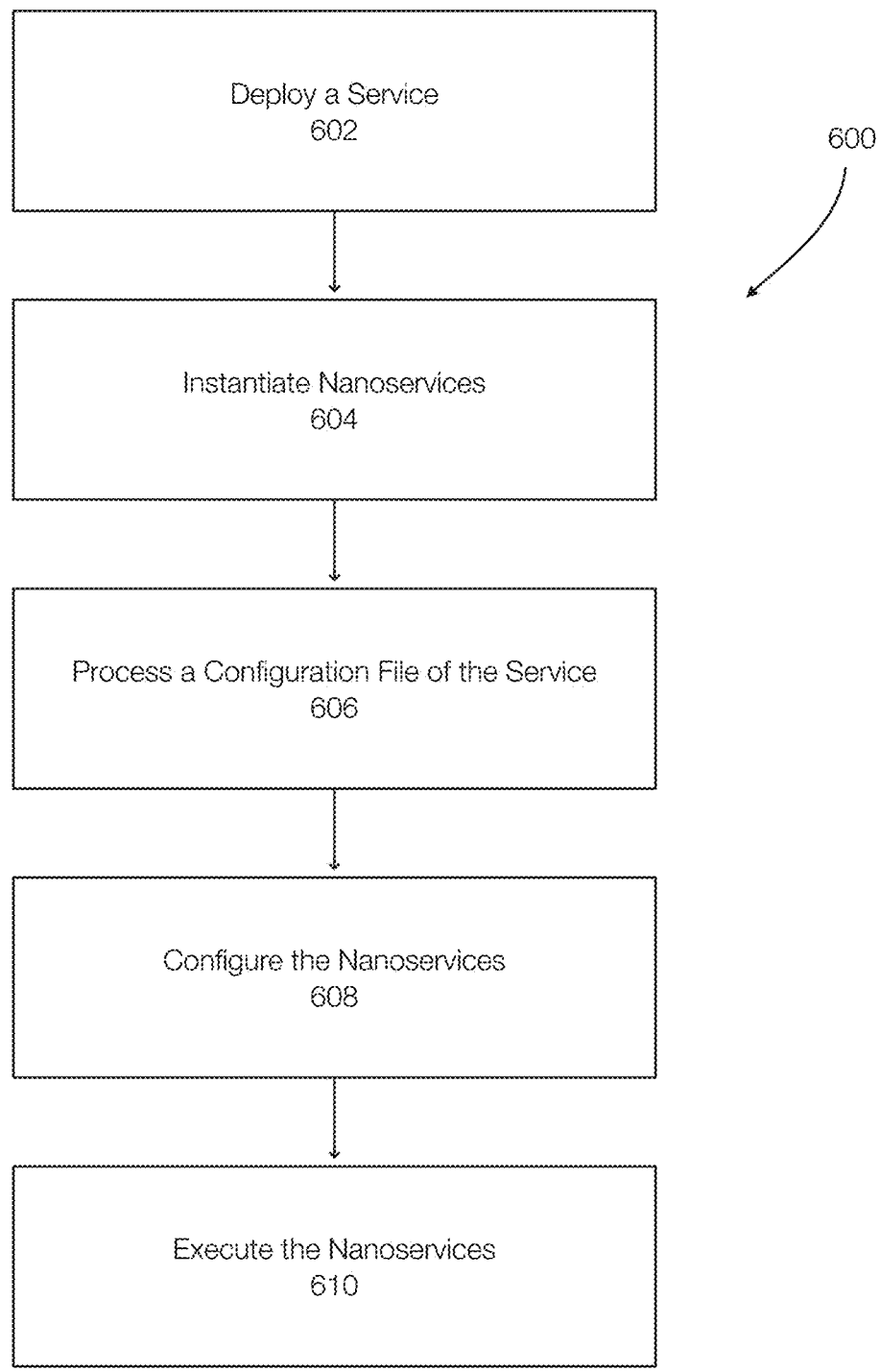
FIG. 6 discloses aspects of implementing a nanoservice architecture.

FIG. 6 discloses aspects of implementing a nanoservice architecture. A method 600 discloses aspects of deploying a service. Prior to deploying a service, however, a configuration file may be prepared. During deployment, the configuration file may be processed or executed. This allows the individual nanoservices of a deployment to be configured both collectively (e.g., for common resources) and individually on the same node or same set of resources.

In an example of the method 600, a service is deployed 602. The service may include or specify one or more nanoservices. The service may be deployed to a node for example. Once deployed or uploaded into memory of the node, the nanoservices are instantiated 604. This may be performed based on a portion of the configuration file. Thus, the configuration file is processed 606 to configure common resources, such as database access or handling, caching, logging, or the like. Using relevant portions of the configuration file, the individual nanoservices are configured 608. Finally, the nanoservices are executed 610.

Nanoservices can be added to the service, removed from the service, updated, or the like. In one example, these actions may require the service or deployment to be stopped/restarted as a whole as all nanoservices are started, stopped, and restarted at the same time.

A nanoservice architecture provides fine component granularity without the overhead associated, by way of comparison, with additional microservices. The nanoservices can share the benefits of a service without being independent services themselves.

A microservice-based system requires communication and orchestration across each of the microservices. These requirements are built into each microservice, and the amount of communication and related complexity will increase with the number of microservices. However, the nanoservice architecture delivers many of the benefits of a microservice-based architecture but with a reduction in communication, orchestration, and complexity due to a reduction in the number of microservices.

Deployment in a nanoservice architecture is simplified due to the configuration pattern, where a set of configuration settings is grouped for deployment but delivered independently to each nanoservice. Configuration values are automatically loaded and accessible as nanoservice-specific variables.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, features or functions of an application. More generally, the scope of the invention embraces any operating environment in which the disclosed concepts may be useful.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

As used herein, the term 'data' is intended to be broad in scope. Thus, that term embraces, by way of example and not limitation, data segments such as may be produced by data stream segmentation processes, data chunks, data blocks, atomic data, sensor data, position data (sensed or acquired), messages, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: A method, comprising: deploying a service that includes a first nanoservice and a second nanoservice to a node operating in an environment, instantiating the first nanoservice and the second nanoservice on the node, processing a configuration file, wherein the configuration file includes a first portion that is relevant to the first nanoservice, a second portion that is relevant to the second nanoservice, and a third portion that is relevant to both the first nanoservice and the second nanoservice, configuring the first nanoservice and the second nanoservice in accordance with the configuration file, and executing the first nanoservice and the second nanoservice on the node.

Embodiment 2. The method of embodiment 1, wherein the configuration file includes an instantiation portion for instantiating the first nanoservice and the second nanoservice.

Embodiment 3. The method of embodiment 1 and/or 2, wherein only the first nanoservice processes the first portion of the configuration file and only the second nanoservice processes the second portion of the configuration file.

Embodiment 4. The method of embodiment 1, 2, and/or 3, wherein the service processes the third portion, wherein the third portion configures at least one of a database and logging for both the first nanoservice and the second nanoservice.

Embodiment 5. The method of embodiment 1, 2, 3, and/or 4, wherein the first nanoservice and the second nanoservice are instantiated as separate threads inside an operating system process.

Embodiment 6. The method of embodiment 1, 2, 3, 4, and/or 5, further comprising caching, by a data handling function, data from a database for consumption by the first nanoservice and the second nanoservice.

Embodiment 7. The method of embodiment 1, 2, 3, 4, 5, and/or 6, wherein the service comprises skeleton code common to the first nanoservice and the second nanoservice.

Embodiment 8. The method of embodiment 1, 2, 3, 4, 5, 6, and/or 7, the service further comprising a nanoservice overhead common to the first nanoservice and the second nanoservice.

Embodiment 9. The method of embodiment 1, 2, 3, 4, 5, 6, 7, and/or 8, further comprising starting, stopping, and/or restarting the first nanoservice and the second nanoservice at the same time.

Embodiment 10. The method of embodiment 1, 2, 3, 4, 5, 6, 7, 8, and/or 9, further comprising adding a third nanoservice to the service without adding to a skeleton code of the service.

Embodiment 11. The method of embodiment 1, 2, 3, 4, 5, 6, 7, 8, 9, and/or 10, wherein the first nanoservice and the second nanoservice are part of an application and are related in function or purpose.

Embodiment 12. The method of embodiment 1, 2, 3, 4, 5, 6, 7, 8, 9, 10, and/or 11, wherein the first nanoservice and the second nanoservice operate independently of each other.

Embodiment 13. The method of embodiment 1, 2, 3, 4, 5, 6, 7, 8, 9, 10, 11, and/or 12, wherein the service is implemented in a node operating in an environment, wherein the node is one of multiple nodes operating in the environment and wherein the multiple nodes each comprise a service that includes one or more nanoservices.

Embodiment 14. The method of embodiment 1, 2, 3, 4, 5, 6, 7, 8, 9, 10, 11, 12, and/or 13, wherein further comprising a forklift or an autonomous device, wherein the node is part of the forklift or the autonomous device.

Embodiment 15. A method for performing any of the operations, methods, or processes, or any portion of any of these, disclosed herein.

Embodiment 16. A non-transitory storage medium having stored therein instructions that are executable by one or more hardware processors to perform operations comprising the operations of any one or more of embodiments 1-15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
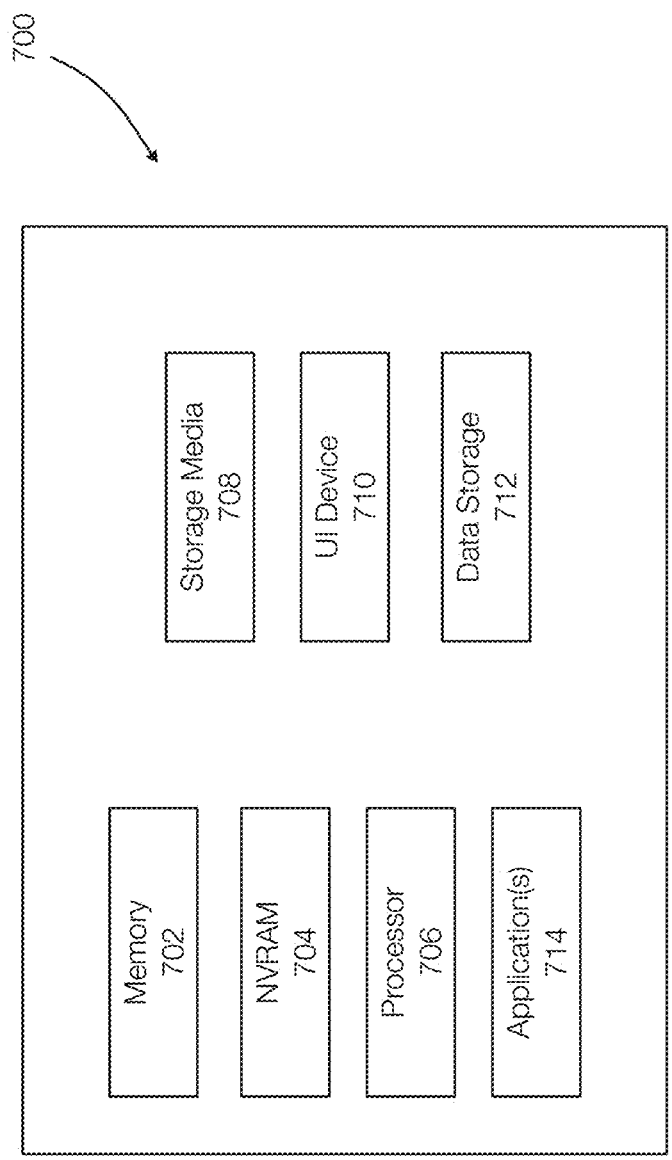
FIG. 7 discloses aspects of a computing device or system.

With reference briefly now to FIG. 7, any one or more of the entities disclosed, or implied, the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    deploying a service that includes a skeleton component, a first nanoservice and a second nanoservice to a node operating in an environment, wherein the skeleton component includes skeleton code common to and used during execution of the first nanoservice and the second nanoservice;
    instantiating the first nanoservice and the second nanoservice on the node;
    processing a configuration file included in the skeleton code, wherein the configuration file includes a first portion that is relevant to the first nanoservice, a second portion that is relevant to the second nanoservice, and a third portion that is relevant to both the first nanoservice and the second nanoservice;
    configuring the first nanoservice and the second nanoservice in accordance with the configuration file;
    executing the first nanoservice and the second nanoservice on the node; and
    after deploying the service and executing the first and second nanoservices on the node, adding a third nanoservice to the service without adding to the skeleton code of the service, wherein the skeleton code is common to and used during execution of the third nanoservice,
    wherein the service is configured such that each of the first nanoservice, the second nanoservice, and the third nanoservice can be removed from the service without starting another instance of the service.

2. The method of claim 1, wherein the configuration file includes an instantiation portion for instantiating the first nanoservice and the second nanoservice.

3. The method of claim 1, wherein only the first nanoservice processes the first portion of the configuration file and only the second nanoservice processes the second portion of the configuration file.

4. The method of claim 1, wherein the service processes the third portion, wherein the third portion configures at least one of a database and logging for both the first nanoservice and the second nanoservice.

5. The method of claim 1, wherein the first nanoservice and the second nanoservice are instantiated as separate threads inside an operating system process.

6. The method of claim 1, further comprising caching, by a data handling function, data from a database for consumption by the first nanoservice and the second nanoservice.

7. The method of claim 1, wherein the service comprises a nanoservice overhead common to the first nanoservice and the second nanoservice.

8. The method of claim 1, further comprising starting, stopping, and/or restarting the first nanoservice and the second nanoservice at the same time.

9. The method of claim 1, wherein the skeleton code includes code to start the first and second nanoservices, handle configurations and modifications related to the first and second nanoservices, and shut down the nanoservices.

10. The method of claim 1, wherein the first nanoservice and the second nanoservice are part of an application and are related in function or purpose.

11. The method of claim 10, wherein the first nanoservice and the second nanoservice operate independently of each other.

12. The method of claim 1, wherein the service is implemented in a node operating in an environment, wherein the node is one of multiple nodes operating in the environment and wherein the multiple nodes each comprise a service that includes one or more nanoservices.

13. The method of claim 12, wherein further comprising a forklift or an autonomous device, wherein the node is part of the forklift or the autonomous device.

14. A non-transitory storage medium having stored therein instructions that are executable by one or more hardware processors to perform operations comprising:
  deploying a service that includes a skeleton component, a first nanoservice and a second nanoservice to a node operating in an environment, wherein the skeleton component includes skeleton code common to and used during execution of the first nanoservice and the second nanoservice;
  instantiating the first nanoservice and the second nanoservice on the node;
  processing a configuration file included in the skeleton code, wherein the configuration file includes a first portion that is relevant to the first nanoservice, a second portion that is relevant to the second nanoservice, and a third portion that is relevant to both the first nanoservice and the second nanoservice;
  configuring the first nanoservice and the second nanoservice in accordance with the configuration file;
  executing the first nanoservice and the second nanoservice on the node; and
  after deploying the service and executing the first and second nanoservices on the node, adding a third nanoservice to the service without adding to the skeleton code of the service, wherein the skeleton code is common to and used during execution of the third nanoservice,
  wherein the service is configured such that each of the first nanoservice, the second nanoservice, and the third nanoservice can be removed from the service without starting another instance of the service.

15. The non-transitory storage medium of claim 14, wherein the configuration file includes an instantiation portion for instantiating the first nanoservice and the second nanoservice, wherein only the first nanoservice processes the first portion of the configuration file and only the second nanoservice processes the second portion of the configuration file.

16. The non-transitory storage medium of claim 14, wherein the service processes the third portion, wherein the third portion configures at least one of a database and logging for both the first nanoservice and the second nanoservice, wherein the first nanoservice and the second nanoservice are instantiated as separate threads inside an operating system process.

17. The non-transitory storage medium of claim 14, further comprising caching, by a data handling function, data from a database for consumption by the first nanoservice and the second nanoservice.

18. The non-transitory storage medium of claim 14, wherein the service further comprises a nanoservice overhead common to the first nanoservice and the second nanoservice and includes the skeleton code common to the first nanoservice and the second nanoservice, the operations further comprising stopping and/or restarting the first nanoservice and the second nanoservice at the same time.

19. The non-transitory storage medium of claim 14, wherein the first nanoservice and the second nanoservice are part of an application and are related in function or purpose, wherein the first nanoservice and the second nanoservice operate independently of each other, wherein the service is implemented in a node operating in an environment, and wherein the node is one of multiple nodes operating in the environment and wherein the multiple nodes each comprise a service that includes one or more nanoservices.

* * * * *

UNITED STATES PATENT AND TRADEMARK OFFICE
CERTIFICATE OF CORRECTION

| | | |
|---|---|---|
| PATENT NO. | : 12,379,938 B2 | Page 1 of 1 |
| APPLICATION NO. | : 17/822294 | |
| DATED | : August 5, 2025 | |
| INVENTOR(S) | : Eric L. Caron et al. | |

It is certified that error appears in the above-identified patent and that said Letters Patent is hereby corrected as shown below:

In the Specification

<u>Column 5</u>
Line 3, change "nanoservices 508, 412, 514" to – nanoservices 508, 512, 514 –

Signed and Sealed this
Twenty-third Day of December, 2025

John A. Squires
*Director of the United States Patent and Trademark Office*